United States Patent Office 3,594,404
Patented July 20, 1971

3,594,404
RACEMIC AND OPTICALLY ACTIVE p-PHENYL-HYDRATROPIC ACID, 2,3-DIHYDROXYPROPYL ESTERS
James R. Fisher, Royal Oak, Mich., assignor to Parke, Davis & Company, Detroit, Mich.
No Drawing. Filed July 1, 1968, Ser. No. 741,276
Int. Cl. C07c 69/76; A61k 27/00
U.S. Cl. 260—469                                                    4 Claims

ABSTRACT OF THE DISCLOSURE 2,3-dihydroxypropyl esters of d-, l-, and dl-p-phenylhydratropic acids, useful as pharmacological agents having anti-inflammatory activity, and their production by (a) reacting p-phenylhydratropic acid, in racemic or in optically active form, or a carboxylate salt thereof, with a 3-halo-1,2-propanediol, and (b) reacting a (1,3-dioxolan-4-yl)methyl ester of d-, l-, or dl-p-phenylhydratropic acid with a strong acid, whereby the dioxolane ring is cleaved.

SUMMARY AND DETAILED DESCRIPTION

The present invention relates to new ester compounds that are useful as pharmacological agents and to methods for their production. More particularly, the invention relates to new 2,3-dihydroxypropyl esters of d-, l-, and dl-p-phenylhydratropic acids, which esters can collectively be represented by the following general formula

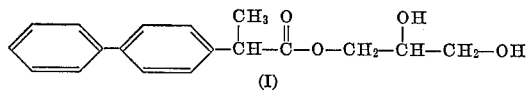

(I)

This formula is intended to represent the ester compounds of the invention in racemic as well as in separated optically active forms.

In accordance with the invention, compounds represented by Formula I above are produced by reacting p-phenylhydratropic acid, which has the formula

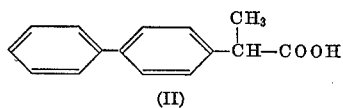

(II)

in racemic or optically active d- or l-form, or a carboxylate salt thereof, with a 3-halo-1,2-propanediol compound having the formula

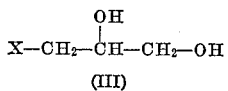

(III)

where X is halogen. When the free p-phenylhydratropic acid is used as a reactant, the reaction is preferably carried out in the presence of at least an equivalent amount of a base. Suitable bases for this purpose include alkali metal hydroxides, alkali metal carbonates, alkaline earth metal hydroxides, alkali metal alkoxides, various amine bases, such as diethylamine, triethylamine, and pyridine, and in a non-hydroxylic solvent, alkali metal hydrides. Examples of carboxylate salts that may be used as reactants are the sodium, potassium, lithium, calcium, magnesium, ammonium, diethylamine, triethylamine, and pyridine salts. The reaction of either the free p-phenylhydratropic acid or a carboxylate salt thereof is best carried out in an unreactive water-miscible solvent medium, although added solvent is unnecessary if 3-chloro-1,2-propanediol is used as the second reactant in large excess. Suitable solvents include lower alkanols, water, tetrahydrofuran, dioxane, ethylene glycol, N,N-dimethylformamide, and mixtures of these. A preferred solvent is 95% ethanol. The temperature and duration of the reaction are not critical and may be varied widely, the temperature between about 50° C. and about 150° C., and the duration between about two and about 48 hours. In a lower alkanol solvent medium, the reaction is most conveniently carried out at the reflux temperature of the reaction mixture for a period that may vary between 24 and 48 hours. In excess 3-chloro-1,2-propanediol the reaction is essentially complete after 3–6 hours at a temperature between 100 and 150° C. The ratio of reactants is not critical and an excess of either the p-phenylhydratropic acid or the 3-halo-1,2-propanediol may be used.

When a carboxylate salt is used as a reactant in the foregoing process, the required salt is prepared by reacting the free p-phenylhydratropic acid with an equivalent amount of a suitable base in an unreactive solvent, evaporating the resulting mixture to dryness, and isolating and drying the salt obtained, which may then be used directly in the reaction described above. Alternatively, the carboxylate salt may be prepared in situ by treating a solution of the p-phenylhydratropic acid in the chosen reaction solvent medium with an equivalent amount of base and reacting further the salt that is formed without isolation.

The optically active d- and l-p-phenylhydratropic acid starting materials are obtained by resolution of racemic dl-p-phenylhydratropic acid. A useful resolution method involves reacting the racemic acid with an optically active base, such as quinine or ephedrine, separating the resulting diastereoisomeric salts by fractional crystallization, and regenerating the optically active acid from each of the separated salts by treatment with acid. This method is illustrated in detail in the examples that follow hereinafter.

Also in accordance with the invention, compounds represented by Formula I above are produced by reacting a dioxolane compound having the formula

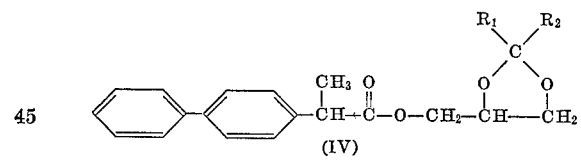

(IV)

in racemic or optically active form, with a strong acid; where each of $R_1$ and $R_2$ is hydrogen or lower alkyl, preferably methyl. Some examples of suitable strong acids that may be used in the reaction are boric acid, formic acid, and the mineral acids, hydrochloric, sulfuric, phosphoric, and nitric, as well as mixtures of these. The amount of acid used is not critical, and it is possible to carry out the reaction successfully using only a catalytic amount. In general, however, it is best to employ an excess of the strong acid reagent. The reaction is advantageously carried out in an unreactive solvent medium. Suitable solvents for this purpose include lower alkanols, such as methanol and ethanol, ethers, such as dioxane and 2-methoxyethanol, ethylene glycol, and N,N-dimethylformamide. When a mineral acid is used in the reaction, a lower alkanol is the preferred solvent. With boric acid, a preferred solvent is 2-methoxyethanol. The reaction is best carried out at a temperature between about 60 and about 125° C., and at such temperature is essentially complete after a period that may vary from about ten minutes to two hours. To avoid acid hydrolysis of the desired p-phenylhydratropic acid, 2,3-dihydroxypropyl ester product, the reaction mixture containing a mineral acid should not be heated for periods longer than about two hours.

The dioxolane compounds having Formula IV above that are used as starting materials in the foregoing process can be prepared by first reacting p-phenylhydratropic acid, in racemic or optically active d- or l-form, with a halogenating agent, such as thionyl chloride, to give the corresponding p-phenylhydratropic acid halide intermediate, which is then reacted with a dioxolane derivative of glycerine having the formula

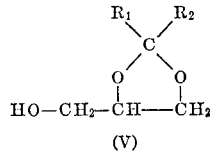

(V)

in the presence of an acid acceptor to give the desired starting material; where $R_1$ and $R_2$ have the same meaning as previously given.

The compounds of the invention are new chemical compounds that are useful as pharmacological agents, especially as anti-inflammatory agents. As such, they are of value in mitigating the symptoms associated with inflammatory conditions, as well as in preventing or suppressing the occurrence of inflammation. Their anti-inflammatory activity is demonstrable and quantitatively measurable in a test designed to measure the ability of a test compound to delay the normal appearance of an erythema in animals exposed to ultraviolet radiation under standardized conditions. The test procedure that is used has been described by Winder, Wax, Burr, Been, and Rosiere in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin. In this standard test procedure, dl-p-phenylhydratropic acid, 2,3-dihydroxypropyl ester and d-p-phenylhydratropic acid, 2,3-dihydroxypropyl ester were both found to be effective at a dose of 0.4 mg./kg.

The compounds of the invention can be administered either orally or parenterally; oral administration, however, is preferred. Because the ester compounds of the present invention are more readily soluble in water than are the parent p-phenylhydratropic free acids, which are also known to exhibit anti-inflammatory activity, the esters offer an advantage in use in those cases where aqueous formulations are desired. Additionally, the ester compounds of the invention are relatively free of the bitter taste that characterizes the alkali metal salts of the p-phenylhydratropic acids, and thus the esters offer an advantage over these salts where a tasteless formulation is desired.

The invention is illustrated by the following examples.

EXAMPLE 1

A mixture consisting of 12.4 g. of the sodium salt of dl-p-phenylhydratropic acid, 10.1 g. of 3-iodo-1,2-propanediol, and 100 ml. of 95% ethanol is heated under reflux for 48 hours, cooled, and filtered. The filtrate is evaporated to dryness, the residue is stirred with 60 ml. of water, and the aqueous mixture is extracted with one 100-ml. portion and two 50-ml. portions of ether. The combined ether extracts are washed with water, with 0.25 N aqueous sodium hydroxide, and with saturated aqueous sodium chloride until neutral, dried, and evaporated to give dl-p-phenylhydratropic acid, 2,3-dihydroxypropyl ester, obtained as a syrup that crystallizes upon stirring with isooctane; M.P. 67–72° C., following crystallization from ethyl acetate-cyclohexane.

EXAMPLE 2

A solution of 5.0 g. of d-p-phenylhydratropic acid in 100 ml. of warm 95% ethanol is treated dropwise with 4 N sodium hydroxide until neutral, and to the resulting solution is added 4.4 g. of 3-iodo-1,2-propanediol. The reaction mixture is next heated under reflux for 48 hours and then concentrated under reduced pressure to remove the ethanol solvent. The residue is stirred with a mixture of 100 ml. of ether and 100 ml. of water, and the ether layer is separated and set aside. The aqueous layer is extracted with three 50-ml. portions of ether, the extracts are combined with the ether layer set aside earlier, and the resulting ethereal solution is washed successively with 50 ml. of 0.25 N sodium hydroxide, with two 50-ml. portions of water, and with 50 ml. of saturated aqueous sodium chloride. The solution is then dried and evaporated to dryness to give a waxy solid residue of d-p-phenylhydratropic acid, 2,3-dihydroxypropyl ester, which is isolated and purified by crystallization from ethyl acetate-cyclohexane; M.P. 74–76° C., $[\alpha]_D^{25}$ +30.9° (1.0% in ethanol).

Utilizing the foregoing procedure, with the substitution of 5.0 g. of l-p-phenylhydratropic acid for the d-p-phenylhydratropic acid, there is obtained l-p-phenylhydratropic acid, 2,3-dihydroxypropyl ester; M.P. 76–78° C., $[\alpha]_D^{25}$ −29.6° (1.01% in ethanol).

The d-p-phenylhydratropic acid starting material is obtained as described in the following.

A solution of 10.0 g. of dl-p-phenylhydratropic acid and 17.0 g. of quinine in 200 ml. of boiling ethanol is allowed to cool slowly, and after seeding with a small amount of quinine mono-d-p-phenylhydratropic acid salt obtained in a preliminary experiment, is kept overnight at room temperature. The thick slurry obtained is diluted with 100 ml. of ethanol, filtered, and the isolated solid quinine mono-d-p-phenylhydratropic acid salt is washed with 50 ml. of ethanol, dried, and crystallized four times from ethanol (10–15 ml./g. of salt) and once from ethyl acetate (52 ml./g.); M.P. 174–175° C., $[\alpha]_D^{25}$ −104° (1.03% in ethanol). This salt intermediate (4.3 g.) is shaken with a mixture of 50 ml. of ether and 20 ml. of 1 N hydrochloric acid, and the ether solution is separated, washed with water, dried, and evaporated to give d-p-phenylhydratropic acid; M.P. 159–160° C., following crystallization from methanol.

d-p-Phenylhydratropic acid can also be obtained on a larger scale as follows. A solution of 165 g. of dl-p-phenylhydratropic acid and 253.7 g. of quinine in 4130 ml. of boiling ethanol is allowed to cool slowly, seeded as above, and kept at room temperature overnight. The slurry obtained is filtered, and the isolated solid is washed with cold ethanol and dried. After four crystallizations from ethanol (13 ml./g.), the solid obtained has M.P. 174–178° C. After four more crystallizations from ethanol (13–17 ml./g.), the solid obtained has M.P. 183.5–184° C., $[\alpha]_D^{25}$ −64° (0.935% in ethanol). It is quinine di-d-p-phenylhydratropic acid salt. This salt intermediate (44.9 g.) is treated with excess 1 N hydrochloric acid in ether, as described above for the quinine mono-d-p-phenylhydratropic acid salt, and the d-p-phenylhydratropic acid obtained from the ether solution is crystallized from methanol, with charcoal treatment; M.P. 159–160° C., $[\alpha]_D^{25}$ +55° (1.0% in ethanol).

The l-p-phenylhydratropic acid starting material is obtained as follows. A solution of 200 g. of dl-p-phenylhydratropic acid and 154 g. of ephedrine in 650 ml. of hot ethanol is allowed to cool slowly, seeded with ephedrine l-p-phenylhydratropic acid salt obtained in a previous small scale experiment, and kept at room temperature for 22 hours. The solid that forms is isolated, washed with 100 ml. of cold ethanol and dried. It is crude ephedrine l-p-phenylhydratropic acid salt, M.P. 130–140° C., which is purified by crystallization four times alternately from ethyl acetate (10 ml./g.) and from ethanol (3 ml./g.) and then four times more from ethyl acetate (17–19 ml./g.); M.P. 152–153° C., $[\alpha]_D^{24}$ −19° (1.02% in ethanol). This salt intermediate (50.9 g.) is shaken with a mixture of 143 ml. of 1 N hydrochloric acid and 700 ml. of ether, and the ether solution is separated, washed with water, dried, and evaporated to give l-p- phenylhydratropic acid; M.P. 158–159.5° C., $[\alpha]_D^{24}$ −57° (1.02% in ethanol), following crystallization from methanol.

EXAMPLE 3

A stirred mixture consisting of 11.3 g. of dl-p-phenylhydratropic acid, 55 g. of 3-chloro-1,2-propanediol, and 7 ml. of triethylamine is slowly heated to 140–150° C. and kept at that temperature for six hours. Upon cooling, the mixture is poured into 100 ml. of water, and the resulting aqueous mixture is extracted with ether. The ether exact is washed successively with water, with 0.5 N sodium hydroxide, and with saturated aqueous sodium chloride, and dried over anhydrous magnesium sulfate. After filtration to remove the drying agent, the ethereal solution is evaporated under reduced pressure to give a syrupy residue of dl-p-phenylhydratropic acid, 2,3-dihydroxypropyl ester, which crystallizes upon stirring with isooctane; M.P. 67–72° C., following crystallization from ethyl acetate-cyclohexane.

EXAMPLE 4

A mixture consisting of 11.9 g. of (2,2-dimethyl-1,3-dioxolan-4-yl)methyl dl-p-phenylhydratropate, 20 g. of boric acid, and 60 ml. of 2-methoxyethanol is stirred and heated at 95–100° C. for one hour, cooled, and mixed with 150 ml. of ether. The ethereal mixture is washed successively with saturated aqueous sodium chloride, with 0.25 N sodium hydroxide, and with saturated aqueous sodium chloride again until it is neutral. The solution is then dried and evaporated under reduced pressure to give dl-p-phenylhydratropic acid, 2,3-dihydroxypropyl ester, obtained as a syrup that crystallizes upon trituration with isooctane; M.P. 67–72° C., following crystallization from ethyl acetate-cyclohexane.

Utilizing the procedure described above, with the substitution of (2,2-dimethyl-1,3-dioxolan-4-yl)methyl d-p-phenylhydratropate for the (2,2-dimethyl-1,3-dioxolan-4-yl)methyl dl-p-phenylhydratropate, there is obtained d-p-phenylhydratropic acid, 2,3-dihydroxypropyl ester, M.P. 74–76° C., $[\alpha]_D^{25}$ +30.9° (1.0% in ethanol), following crystallization from ethyl acetate-cyclohexane.

The starting materials used in the foregoing procedure are obtained as follows. A mixture of 5.0 g. of dl-p-phenylhydratropic acid and 10 ml. of thionyl chloride is stirred and heated under reflux for one hour and then evaporated under reduced pressure to give a solid residue of dl-p-phenylhydratropoyl chloride, M.P. 63–65° C., following crystallization from petroleum ether. To a mixture consisting of 24.5 g. of this acid chloride intermediate, 13.2 g. of isopropylidene glycerol, and 150 ml. of dry acetone is slowly added 14.0 ml. of triethylamine. The resulting mixture is stirred and heated under reflux for four hours, cooled, filtered, and the filtrate evaporated under reduced pressure. The residue is dissolved in 200 ml. of ether, and the ethereal solution is washed successively with saturated aqueous sodium chloride with 0.25 N sodium hydroxide, and with saturated aqueous sodium chloride until it is neutral. The solution is then dried and evaporated to dryness under reduced pressure to give the desired (2,2-dimethyl-1,3-dioxolan-4-yl)methyl dl-p-phenylhydratropate, suitable for use without further purification. (2,2-dimethyl-1,3-dioxolan-4-yl)methyl d-p-phenylhydratropate is obtained similarly by substituting d-p-phenylhydratropic acid for the dl-p-phenylhydratropic acid in the first step above.

EXAMPLE 5

Concentrated hydrochloric acid (1.6 ml.) is added dropwise to a stirred mixture consisting of 14.1 g. of (2,2-dimethyl-1,3-dioxolan-4-yl)methyl dl-p-phenylhydratropate and 50 ml. of ethanol, and the resulting solution is stirred and heated under reflux for 20 minutes. Upon cooling, the solution is diluted with 100 ml. of water, and the aqueous mixture is extracted with ether. The ether extract is washed successively with saturated aqueous sodium chloride, with 0.5 N sodium hydroxide, and with saturated aqueous sodium chloride again until it is neutral. The solution is then dried and evaporated to give a syrupy residue of dl-p-phenylhydratropic acid, 2,3-dihydroxypropyl ester, which crystallizes upon trituration with isooctane; M.P. 67–72° C., following crystallization from ethyl acetate-cyclohexane.

What is claimed is:

1. A member of the class consisting of racemic and optically active p-phenylhydratropic acid, 2,3-dihydroxypropyl esters, which esters are collectively represented by the formula

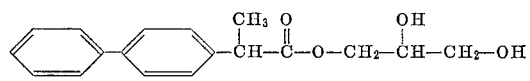

2. A compound according to claim 1 which is dl-p-phenylhydratropic acid, 2,3-dihydroxypropyl ester.
3. A compound according to claim 1 which is d-p-phenylhydratropic acid, 2,3-dihydroxypropyl ester.
4. A compound according to claim 1 which is l-p-phenylhydratropic acid, 2,3-dihydroxypropyl ester.

References Cited

UNITED STATES PATENTS 2,408,905   5/1970   Black et al. _____ 260—340.7

OTHER REFERENCES

Organic Synthesis, vol. 1, Vartkes Migrdichian, pp. 326–327.

CHARLES B. PARKER, Primary Examiner

J. L. DAVISON, Assistant Examiner

U.S. Cl. X.R.

424—308